United States Patent [19]

Yoshida et al.

[11] Patent Number: 4,519,193
[45] Date of Patent: May 28, 1985

[54] FRUIT HARVESTING APPARATUS WITH TELEVISION CAMERA AND MONITOR

[75] Inventors: Jituo Yoshida, Izumi; Shigeaki Okuyama, Kawachinagano; Hiroshi Suzuki, Tondabayashi, all of Japan

[73] Assignee: Kubota, Ltd., Osaka, Japan

[21] Appl. No.: 496,218

[22] Filed: May 19, 1983

[30] Foreign Application Priority Data

Aug. 11, 1982 [JP] Japan .................................. 57-140021

[51] Int. Cl.³ .............................................. A01D 46/00
[52] U.S. Cl. .................................... 56/328 R; 56/10.2; 901/6
[58] Field of Search ............. 56/10.2, DIG. 15, 327 R, 56/328 R, 327 A, 330; 901/2, 6, 9

[56] References Cited

U.S. PATENT DOCUMENTS

| 3,460,327 | 8/1969 | Johnson et al. | 56/328 R |
| 3,564,826 | 2/1971 | Middleton | 56/328 R |
| 4,425,751 | 1/1984 | Bousseau et al. | 56/327 A |

FOREIGN PATENT DOCUMENTS 2495432  6/1982  France ............................. 56/327 A

*Primary Examiner*—Hugh R. Chamblee
*Assistant Examiner*—John G. Weiss
*Attorney, Agent, or Firm*—Cushman, Darby & Cushman

[57] ABSTRACT

A fruit harvesting apparatus in which the positions of fruit are searched and detected by a television camera with a variable shooting direction. Both the television camera and a spot light emitting device, such as a laser, are varied in position and direction in accordance with instructions to locate a fruit. A movable fruit picker is then moved to the determined position of the fruit and operated to pick the fruit.

6 Claims, 12 Drawing Figures

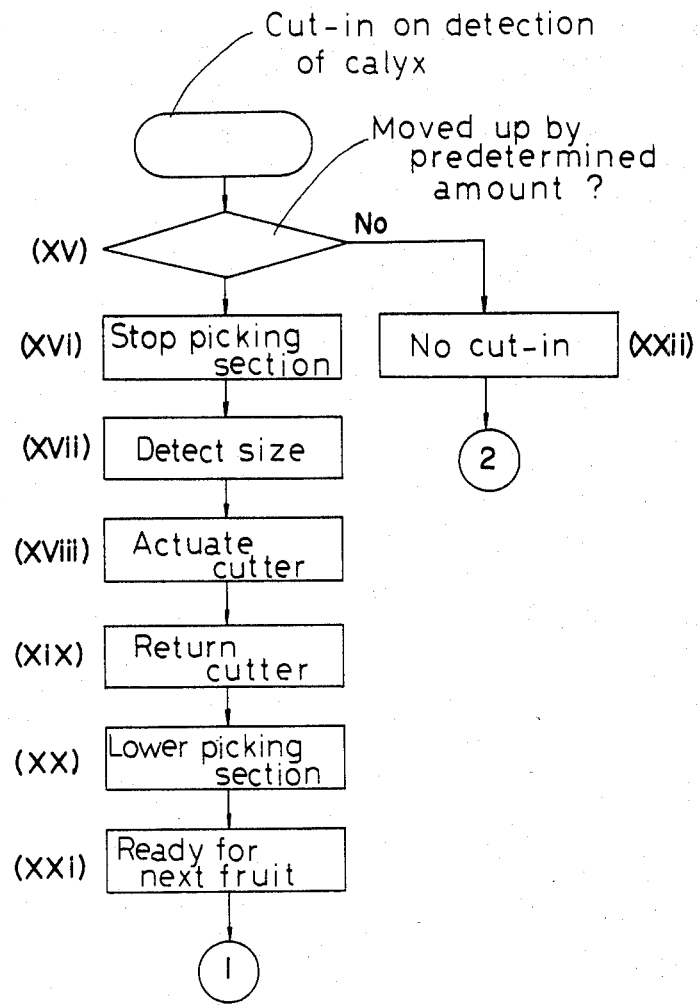

FRUIT HARVESTING APPARATUS WITH TELEVISION CAMERA AND MONITOR

BACKGROUND OF THE INVENTION (1) Field of the Invention

This invention relates to a truly novel fruit harvesting apparatus for picking oranges, apples and other fruits.

(2) Description of the Prior Art

Fruit picking has heretofore been a manual operation and its mechanization has not been developed to date. It is strongly desired to mechanize the fruit picking operation since it not only requires many hands but is a harder labor than it seems.

SUMMARY OF THE INVENTION

Having regard to the above state of the art, an object of this invention is to free the workers from the laborious fruit picking operation and to provide a substantially automatic apparatus to replace the manual work.

In order to achive this object, a fruit harvesting apparatus according to this invention comprises fruit detector means to search and detect positions of fruit, mover means to move a fruit picking section, and control means to control the mover means according to the positions of fruit detected by the fruit detector means in order to move the fruit picking section to positions suited to pick the fruit.

The apparatus of this invention having the above characteristic construction is capable of automatically picking an objective fruit, which almost completely frees the worker from the hard labor practised heretofore. Since this apparatus picks fruit one after another, it is not limited in its range of picking operation to one kind of fruit but is applicable to a wide variety of fruits.

Other objects and advantages of this invention will be apparent from the following description.

BRIEF DESCRIPTION OF THE DRAWINGS

The drawings illustrates fruit harvesting apparatus according to this invention, in which.

DETAILED DESCRIPTION OF THE PREFERRED EMBODIMENT

(I) Overall Construction

Figure 1:
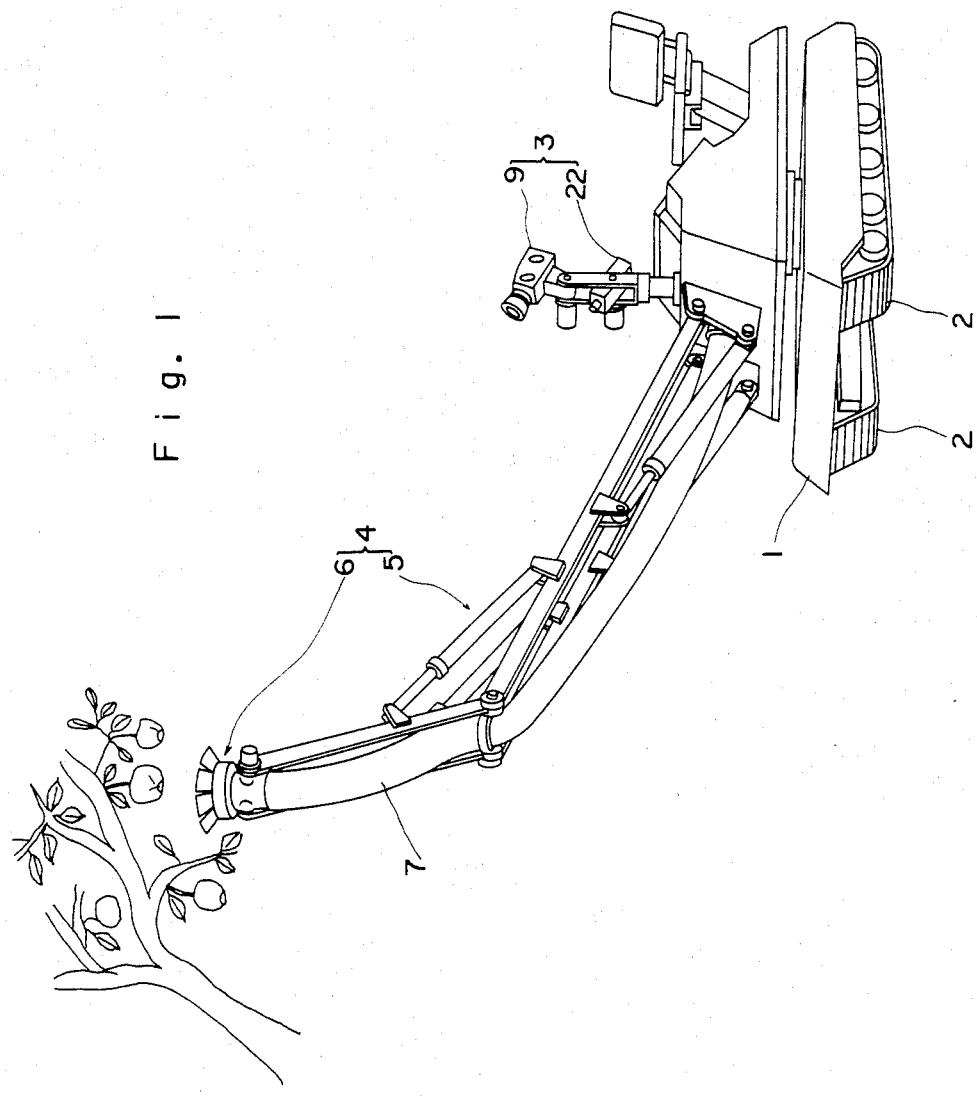
FIGS. 1 and 2 are perspective views each depicting a fruit harvesting apparatus.
Figure 2:
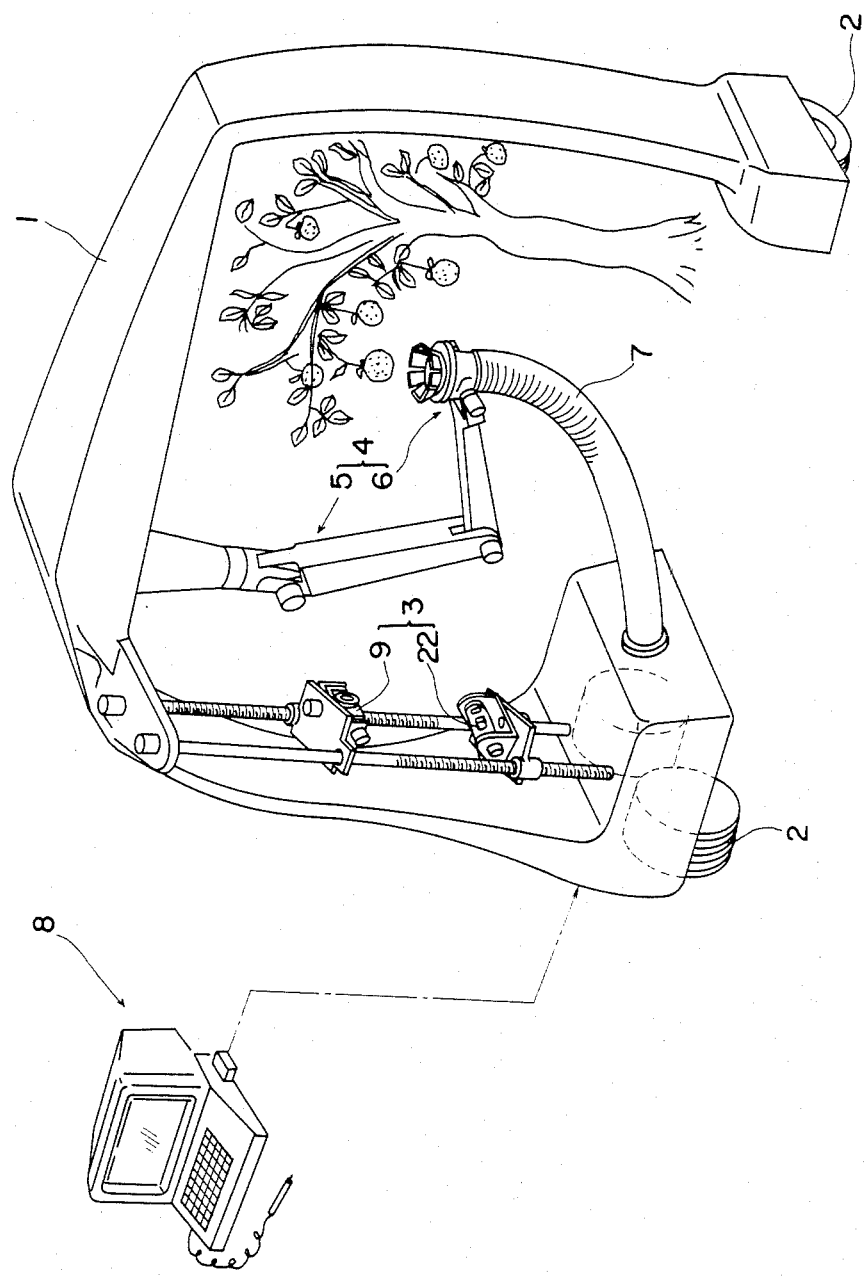

FIGS. 1 and 2 each show an outward appearance of a fruit harvesting apparatus according to this invention. The apparatus of FIG. 1 is an example of the riding type, while the apparatus of FIG. 2 is an example of remote control type operable in response to instructions from a monitor 8 located separately from the main frame as shown.

The riding type fruit harvesting apparatus in FIG. 1 is adapted to pick fruit from under a tree, and is therefore suitable for picking apples and the like which are borne on relatively tall trees. On the other hand, the remote control type fruit harvesting apparatus of FIG. 2 has an arch-like frame 1 to straddle over a tree while picking fruit therefrom, which permits the apparatus to operate where small trees, such as of orange, stand close together with narrow spaces among one another.

In order to be movable to a desired position, each of these fruit harvesting apparatus comprises a main frame 1 provided with running means 2, a fruit position detector 3 mounted on the main frame 1 to detect a position of fruit, and a picking means 4.

The picking means 4 of either apparatus comprises an articulated arm assembly 5 having a high degree of freedom and a picking section 6 mounted at an extreme end of the arm assembly 5, the picking section 6 being movable by the arm assembly 5 to a suitable position for picking fruit. The articulated arm assembly 5 acting as the mover means may comprise a hydraulically actuated link mechanism as shown in FIG. 1, an electrically actuated mechanism made of highly rigid elements as shown in FIG. 2, or any other flexible mechanism including a plurality of joints to have a high degree of freedom.

Fruit picked by the picking section 6 at the extreme end of the arm assembly 5 may be taken to a collecting section provided at a certain position by moving the arm assembly 5. However, for the interest of harvesting efficiency, the apparatus of FIGS. 1 and 2 include a stretchable and flexible conveyer tube 7 extending between the picking section 6 and the main frame 1 for conveying fruit to a collecting section (not shown) in the main frame 1. FIG. 1 shows the conveyor tube 7 mounted in the arm assembly 5 to prevent the tube 7 from interfering with movement of the arm assembly 5 whereby the arm assembly 5 has a wide range of choice for its attaching position.

Furthermore, reference number 3 in FIGS. 1 and 2 denotes an example of fruit position detector including a TV camera 9, and its construction and operation will be described in detail later.

The running means 2 may be be vertically movable relative to the main frame 1, or an auxiliary device such as an outrigger may be provided, in order that the apparatus may operate on a sloped ground.

(II) Construction of the Picking Section

Figure 3:
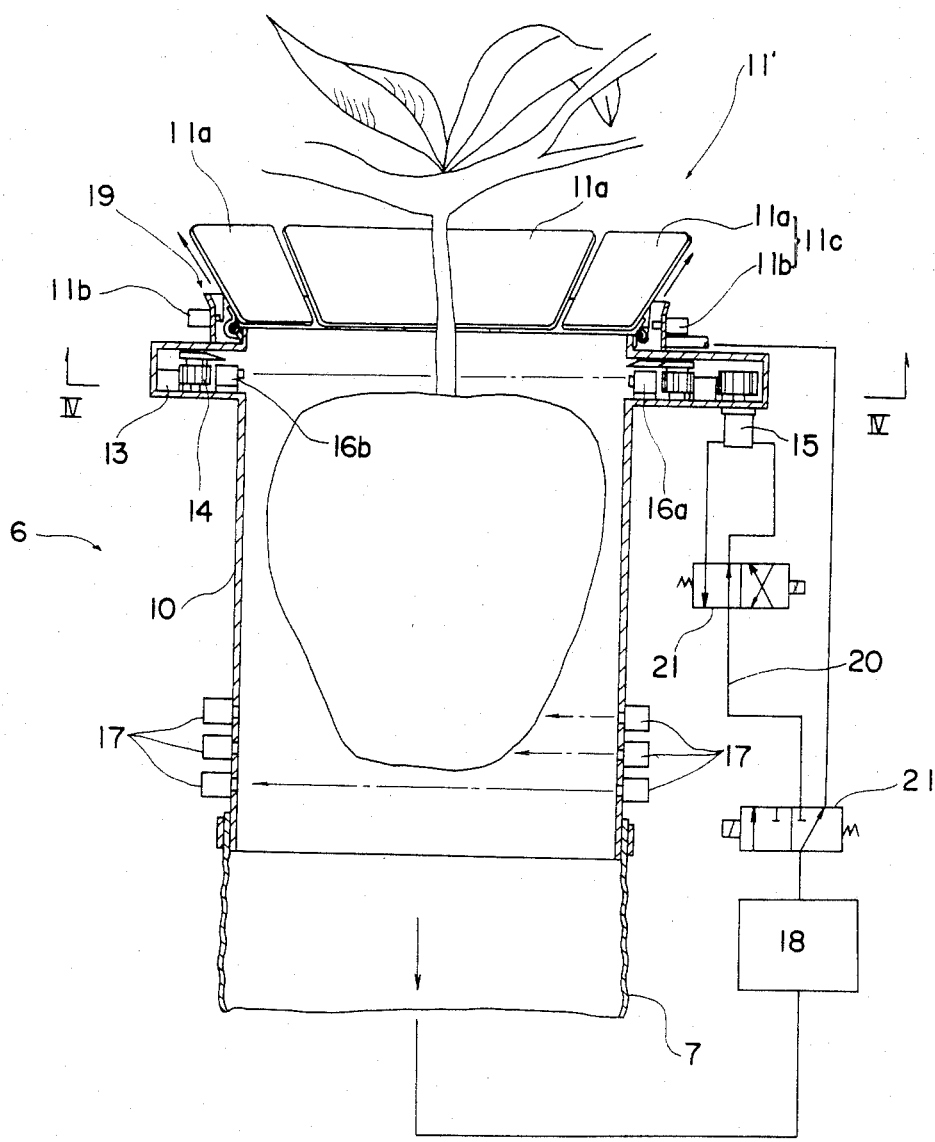
FIG. 3 is a vertical section of a picking section.

Referring to FIG. 3, the picking section 6 comprises a cylindrical trap 10, and an upwardly diverging guide 11 mounted around a top opening of the trap 10 to facilitate capture of fruit in the trap 10, air being drawn in through the top opening.

The guide 11 acts also as a contact sensor to detect and transmit a signal as to the direction in which a contact is made with an object, this function being particularly described later. This signal provides a basis for controlling the arm assembly 5 to bring the picking section 6 at the end of the arm assembly 5 to a position to introduce a fruit into the trap 10. Furthermore, the picking section 6 includes an air exhaust port 19 opening upwardly around the guide 11 to blow away leaves lying close to the fruit as the picking section approaches the fruit.

In order to function also as contact sensor 11c as mentioned above, the guide 11 comprises a plurality of contact members 11a each slightly oscillatable downwardly. Each of the contact members 11a has a switch 11b to detect its oscillation upon contact with the fruit. The contact sensor 11c is not limited to the described construction but may comprise, for example, a tough sensor mounted on an inner wall of the guide 11.

The trap 10 carries a calyx cutter 12 on a top portion thereof to cut a calyx of the fruit introduced into the trap 10 by means of the described construction.

Figure 4:
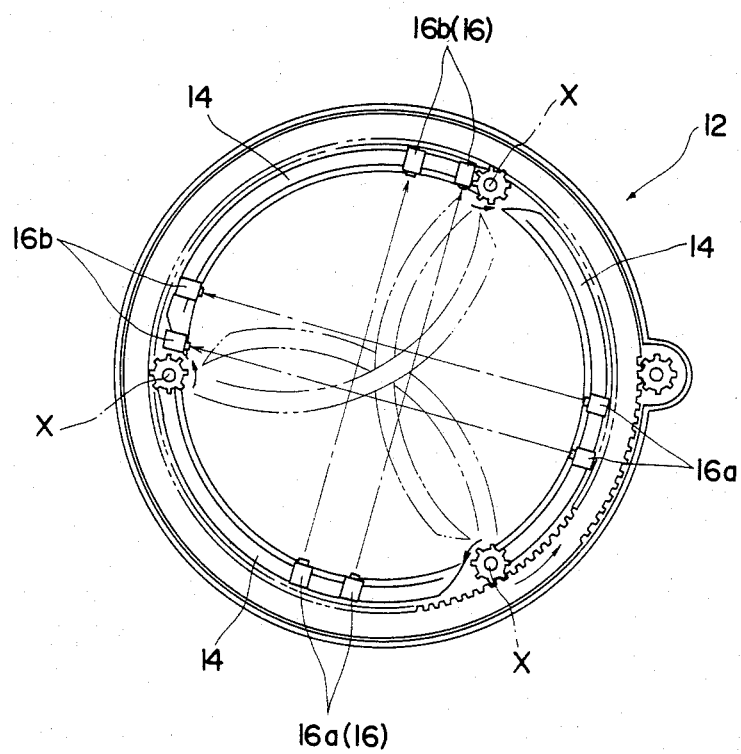
FIG. 4 is a sectional view taken on line IV—IV of FIG. 3, FIGS. 5(A) and (B) are flow charts showing an arm control sequence.

As shown in FIG. 4, the cutter 12 comprises a plurality of blades 14 arranged interiorly of an outer ring gear 13, each of the blades 14 having a gear portion in mesh with the ring gear 13 and rotatable on an axis X. The outer ring gear 13 is concentric with the top opening of the trap 10. An air motor 15 is mounted on the trap 10 to rotate the outer ring gear 13. When the outer ring gear 13 is rotated by the air motor 15 in a direction shown by an arrow, the blades 14 swing on their respective axes X fixed to the trap 10 in directions shown by arrows with the crossing points of the blades 14 concentrating to cut the calyx. Thus, the calyx is cut after being brought to the center of the top opening of the trap 10, which does not apply an excessive force to the fruit which would damage it. This cutter positively breaks the calyx without permitting its elusion.

Position setting required for the cutter 12 in cutting the calyx is carried out by a control method to be described hereinafter which utilizes signals given by a plurality of photosensors 16 disposed immediately below the blades 14 of the cutter 12.

Each of these photosensors 16 comprises a pair of light emitters 16a and a pair of light receivers 16b, and is disposed such that the lights travel across the top opening of the trap 10 as deviated sideways from the center of the opening of approximately by a calyx thickness, respectively. Therefore all the lights are intercepted when a fruit lies opposed to the cutter 12 but, when the thin calyx lies opposed to the cutter 12, at least part of the lights is not intercepted and the photosensors 16 transmit signals accordingly. On the basis of such signals the picking section is set in position where the calyx is opposed to the cutter 12.

Similar photosensors 17 are provided at a lower portion of the trap 10 which are arranged vertically at certain intervals and which emit lights crossing a cetral axis of the trap 10. When the position is set in accordance with the signals given by the foregoing photosensors 16a and 16b, these sensors 17 detect a bottom position of the fruit to provide information as to the size of the fruit. Although the sensors 17 are provided for the purpose of detecting the fruit size, they may also be utilized to ensure that the fruit is positively contained in the trap 10.

The trap 10 is connected at a bottom opening to the collecting section in the main frame 1 through the flexible and stretchable conveyor tube 7 as already described. The picked fruit with its calyx cut passes through the conveyor tube 7 to the collecting section driven by the air taken in at the trap 10 and by gravity.

The air is drawn by an air pump 18 mounted on the main frame 1, and exhaust air therefrom is sent through an exhaust duct 20 securely supported by the conveyor tube 7, to the air exhaust port 19 around the guide 11 and to the air motor 15 to actuate the cutter 12. The exhaust duct 20 leading to the air motor 15 is provided with magnet valves 21 and 21' which receives signals from a computer and control the air motor 15 as necessary. While the calyx cutter 12 is actuated by using the exhaust air in this example, a pneumatic cylinder may be used in place of the air motor, or any other power source such as an electric motor may be used to actuate the cutter 12.

Further, the fruit picking operation may be carried out reliably be serecting a material having an appropriate rigidity (such as rubber) to form the contact members 11a of the guide 11, in accordance with the fruit to be picked.

Part of the exhaust air may be blown out inside the top opening of the trap 10 in order to place the fruit centrally of the opening of the trap 10.

(III) Arm Assembly Control

The arm assembly 5 is controlled by a computer which is programmable with what is known as the robot language by preparing basic routines such as a routine for moving the extreme end of the arm assembly 5 to a given coordinate or a routine for moving the extreme end by a given degree. The robot language as well as the control system for the arm assembly 5 may be the same as or similar to those which are already known.

This computer is adapted to take signals from a plurality of sensors and to vary controls according to these signals. Specifically, the signals from the contact sensors 11c consisting of the contact members 11a and the switches 11b and from the photosensors 16 and 17 in the trap 10 are fed to the computer to provide bases for its control action.

Figure 5:
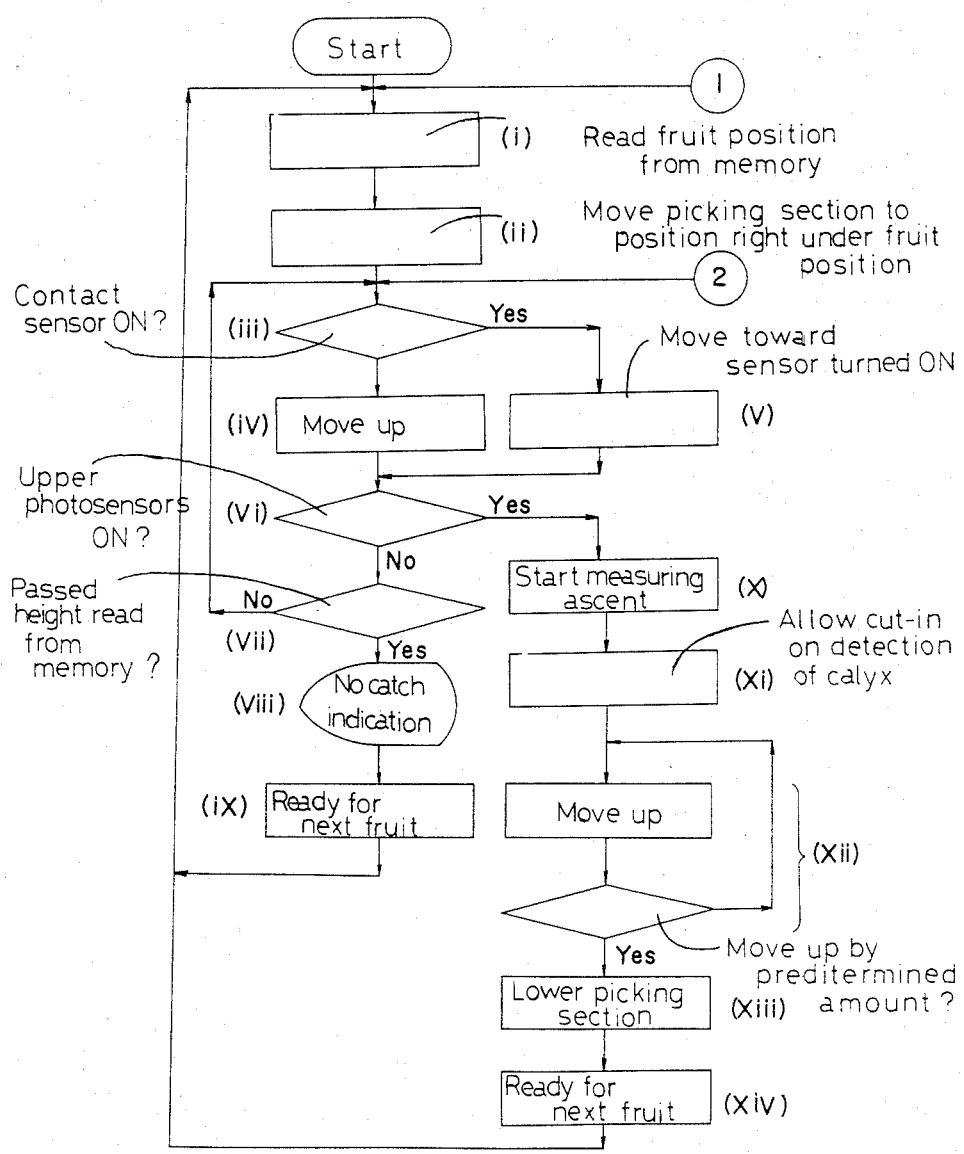

The arm assembly 5 is controlled by this computer in a sequence as shown in FIGS. 5(A) and (B).

Referring to FIG. 5(A), at an opening stage (i) a position of fruit to be picked is read from a memory of the computer, and at stage (ii) the picking section 6 is moved to a position R right under and at a certain distance from the position of the fruit. Positions of fruit are determined by means of and steps to be described later, a picking order is determined and the positions are rearranged and stored in that order in the memory in advance. During this picking stages the fruit positions are just read from the memory on after another.

The control action then moves on to the stages (iii) to (vii) in which, in response to signals from the contact sensors 11c of the guide 11, the picking section is moved in a direction of the contact sensor or sensors 11c which has/have contacted the fruit and gradually upwardly to bring the trap 10 to a position immediately under the fruit while adjusting its horizontal position.

When the photosensors 16 at the top opening of the trap 10 give a signal during the upward movement that all the lights are intercepted, the computer detects this signal at stage (vi) and its control action moves on to stage (x). If, on the other hand, the light interception is not given by the photosensors 16 till after they have risen above a height read from the memory, the control moves from the stage (vii) to stages (viii) and (ix) to stop the picking operation for this fruit and start for a next fruit to be picked. The control moves on to the stage (x) if the photosensors 16 give the signal, as described above, that the bottom of the fruit has entered the top opening of the trap 10 during the stages (iii) to (vii). The subsequent control checks to see whether or not what has entered the trap 10 is a fruit and actuates the cutter 12 to do the picking only when the fruit is confirmed.

The fruit is confirmed by measuring a distance by which the picking section 6 ascends after the above light interception signal is given by the photosensors 16 at the top opening of the trap 10 until a non light interception signal is given by a certain number of the photosensors 16. Only when this distance is in a certain range, it is judged the fruit lies inside the trap 10 and its calyx lies opposed to the photosensors 16, whereupon the cutter 12 is actuated for the picking operation.

Thus the ascent distance measurement starts at the stage (x). The next stage (xi) is for permitting a cut-in when the non light interception signal is given by the photosensors at the top opening of the trap 10.

The picking section 6 is raised by the arm assembly 5 according to a sequence shown by reference (xii). If the cut-in occurs during the ascent, the control moves on to the sequence of FIG. 5(B) in which the cutter 12 is actuated after checking to find out that the distance of ascent is in the certain range. On the other hand, where no cut-in takes place until after the picking section 6 rises by a certain distance, the control moves on to a sequence denoted by reference (xiii) and (xiv) to stop the picking operation for this fruit and return the picking section 6 to the initial position R to be ready to pick the next fruit.

When the control action moves to the sequence of FIG. 3(B) following the cut-in, checking is made at a stage (xv) as to whether the picking section 6 has moved up by a distance predetermined according to a fruit size. If the distance of ascent is short of the predetermined value, the control passes a stage (xxii) and returns to the stage (iii) of FIG. 5(A) whereupon the operation is carried out all over again from the introduction of the fruit. Thus, the checking of the distance of ascent eliminates an operational error due to entry to the trap 10 of leaves or other unwanted things.

An ascent by the predetermined distance proves that fruit is inside the trap 10, and the control action moves on to stages (xvi) to (xxi) of FIG. 5(B). The picking section 6 is brought to a standstill, and the cutter 12 is actuated to pick the fruit after its size is detected by the photosensors 17 provided in a lower portion of the trap 10. Thereafter the picking section 6 is returned to the initial position R which ends the picking operation for this fruit and the apparatus is ready for a next operation.

The fruit size detected by the photosensors 17 in the lower portion of the trap 10 is for the purpose of sorting, but may be used to avoid operational errors. That is, these photosensors 17 are used to find out whether a fruit is in the trap 10 or not, and only when its presence is detected the cutter 12 is actuated by operating the valves 21 and 21'.

(IV) Position Detector

Figure 6:
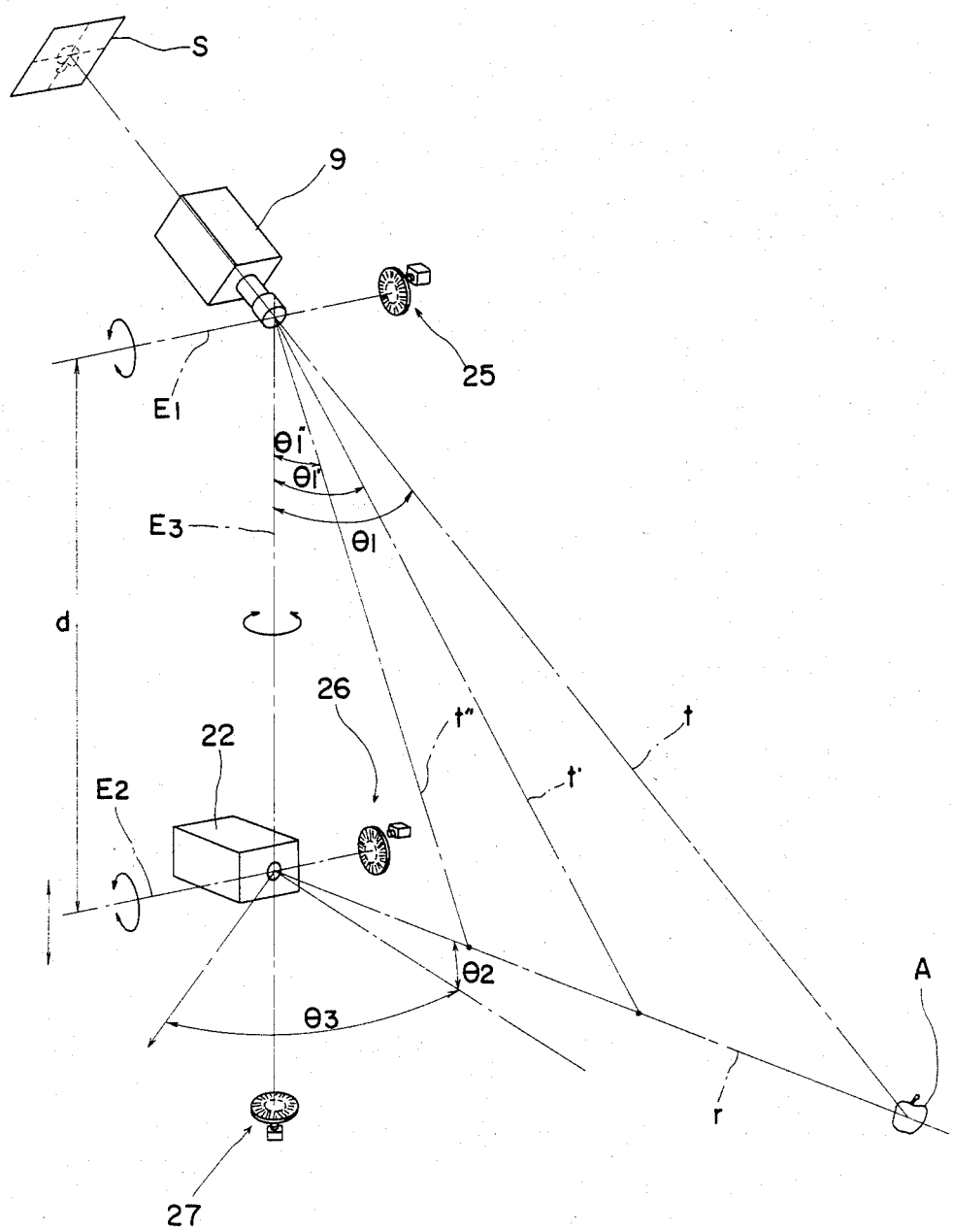
FIG. 6(A) is a view showing a principle of an example of fruit detector, FIGS. 7(A) and (B) are a view and a flow chart corresponding to FIGS. 6(A) and (B), respectively, and pertaining to another example of fruit detector, and FIGS. 8(A) and (B) are a view and a flow chart corresponding to FIGS. 6(A) and (B), respectively, and pertaining to a further example of fruit detector.
Figure 6:
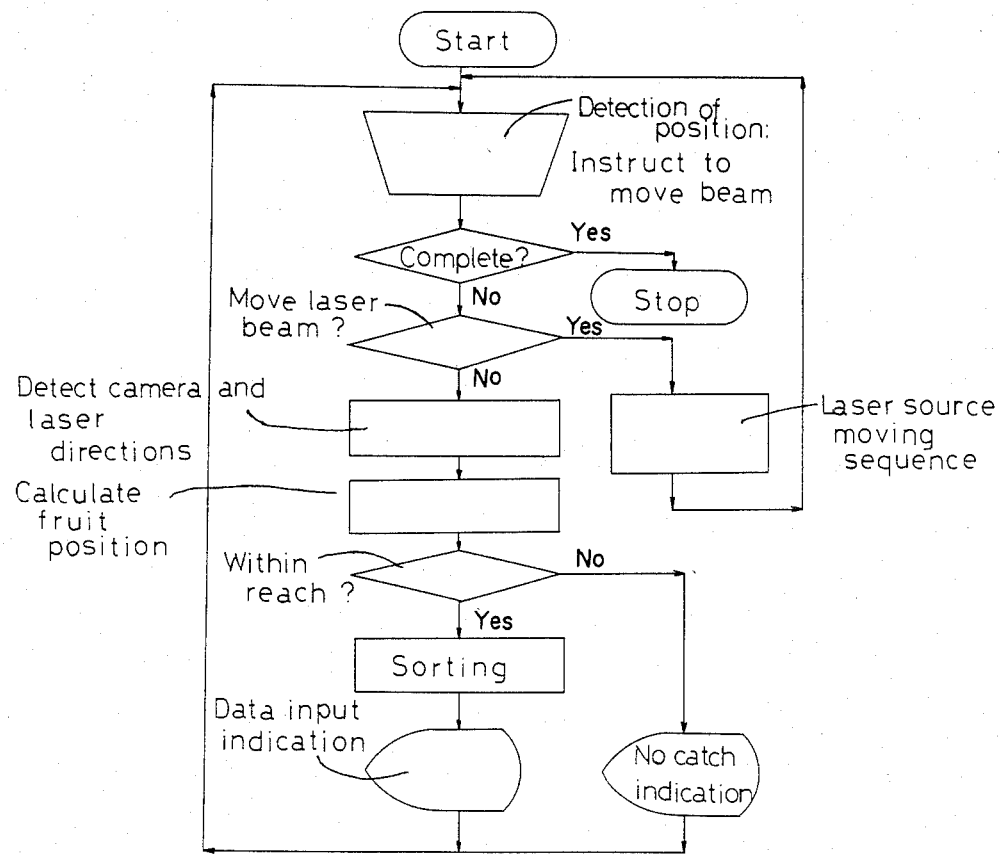

FIG. 6(A) is a view showing a principle of an example of fruit position detector which comprises a TV camera 9 and a laser source 22 and is operable according to the sequence of FIG. 6(B).

The TV camera 9 is pivotable by means of a motor (not shown) on a first horizontal axis E1 with an optic axis t thereof perpendicular to the first horizontal axis E1. The laser source 22, which is a spot beam emitter, also is pivotable by a motor (not shown) on a second horizontal axis E2 with an optic axis r thereof perpendicular to the second horizontal axis E2. Both the TV camera 9 and laser source 22 are pivotable by means of motors (not shown) on a vertical axis E3 also.

The two horizontal axes E1 and E2 are parallel to each other. The first horizontal axis E1, the optic axis t of the TV camera 9, and the vertical axis E3 cross one another at one point, and the second horizontal axis E2, the optic axis r of the laser source 22, and the vertical axis E3 also cross one another at one point. The two horizontal axes E1 and E2 are pivotable on the vertical axis E3 while remaining parallel to each other, and the second horizontal axis E2 is movable along the vertical axis E3 while remaining parallel to the first horizontal axis E1.

Therefore, the TV camera 9 and the laser source 22 have the respective optic axes t and r constantly lying on one plane which is rotatable on the vertical axis E3. The optic axes t and r are rotatable and cross each other at one point on that plane except when parallel to each other.

Turning angles $\theta 1$, $\theta 2$ and $\theta 3$ from references on the respective axes E1, E2 and E3 are detected by a first, a second and a third rotary encoders 25, 26 and 27 mounted thereon.

Further, the TV camera 9 is pivotable on the first horizontal axis E1 by a control console (not shown) as desired. The computer which controls this position detector 3 receives instructions concerning movement of the laser source 22, detection of the position, completion of the operation, and the turning angle on the second horizontal axis E2 which is an offset of the laser source 22.

On instructions the computer moves the laser source 22 in a certain sequence as shown in the flow chart of FIG. 6(B). According to the sequence of this embodiment, on each instruction the laser source 22 is made to rotate by a certain degree within a predetermined range about the vertical axis E3. When the rotation over the predetermined range is complete, the laser source 22 is raised intermittently along the vertical axis E3 by a certain distance within a predetermined range and is made to repeat the rotation at each stopping position. Thus a laser beam along the optic axis r, which moves at each moving instruction, is emitted at certain intervals within a certain searching range.

The operation causes the TV camera 9 to pivot on the first horizontal axis E1 each time the laser beam is moved, whereby the fruit A irradiated by the laser beam is caught at a reference point on a screen and its coodinate is put into the computer. The screen is the same as a type picture optically shown at S and the reference point corresponds to the optic axis t of the TV camera 9. The coordinate of the fruit position is calculated on the basis of turning angles $\theta 1$, $\theta 2$ and $\theta 3$ about the respective axes E1, E2 and E3 and a distance d between the TV camera 9 and the laser source 22.

As shown in FIG. 6(B), an instruction to detect the position is given to the computer which then takes in each of the above information, is angles $\theta 1$, $\theta 2$, $\theta 3$ and distance d and calculates the coordinate of the position of fruit A by using the principle of triangulation and cylindrical coordinates. The computer judges on the basis of the resulting coordinate whether or not the coordinate is within reach of the picking means 4. If it is out of reach, the computer merely gives an indication to that effect to the operator. If it is within reach, the coordinate is compared with fruit positions thus far detected in certain respects described below, in order to determine a picking order, and the positions are stored in the memory after a sorting operation to arrange the positions in that order. In the picking order first priority is given to fruit in lower positions and then to fruit in nearer positions. Therefore, the picking operation proceeds from fruit at a lowermost position, and from the nearest fruit on a substantially equal height.

To describe the offset angle θ2 of the laser source 22, the fruit searching range is variable with changes in the degree of this angle and, when the laser beam hits obstacles such as leaves, the degree of this angle may be changed to avoid them.

Figure 7:
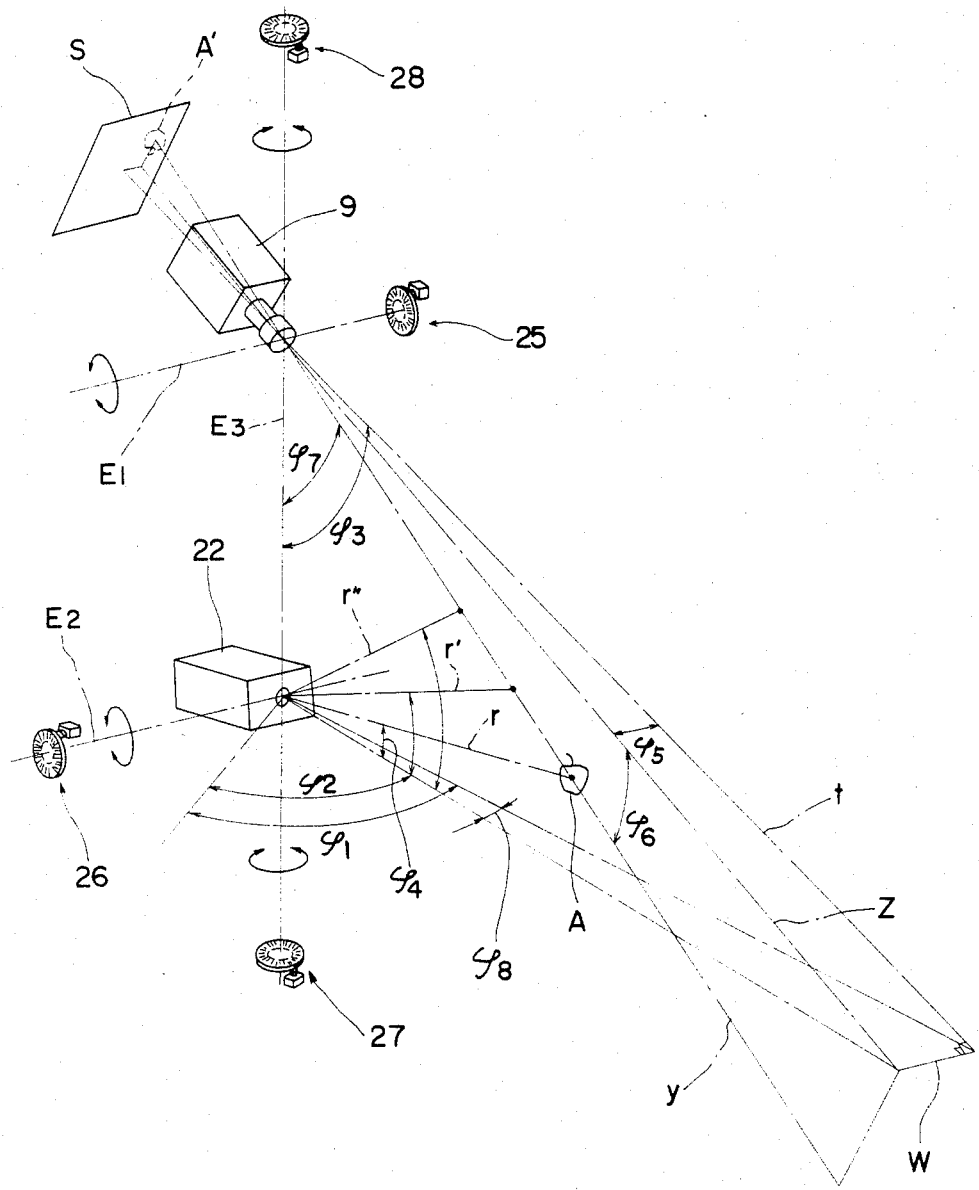
Figure 7:
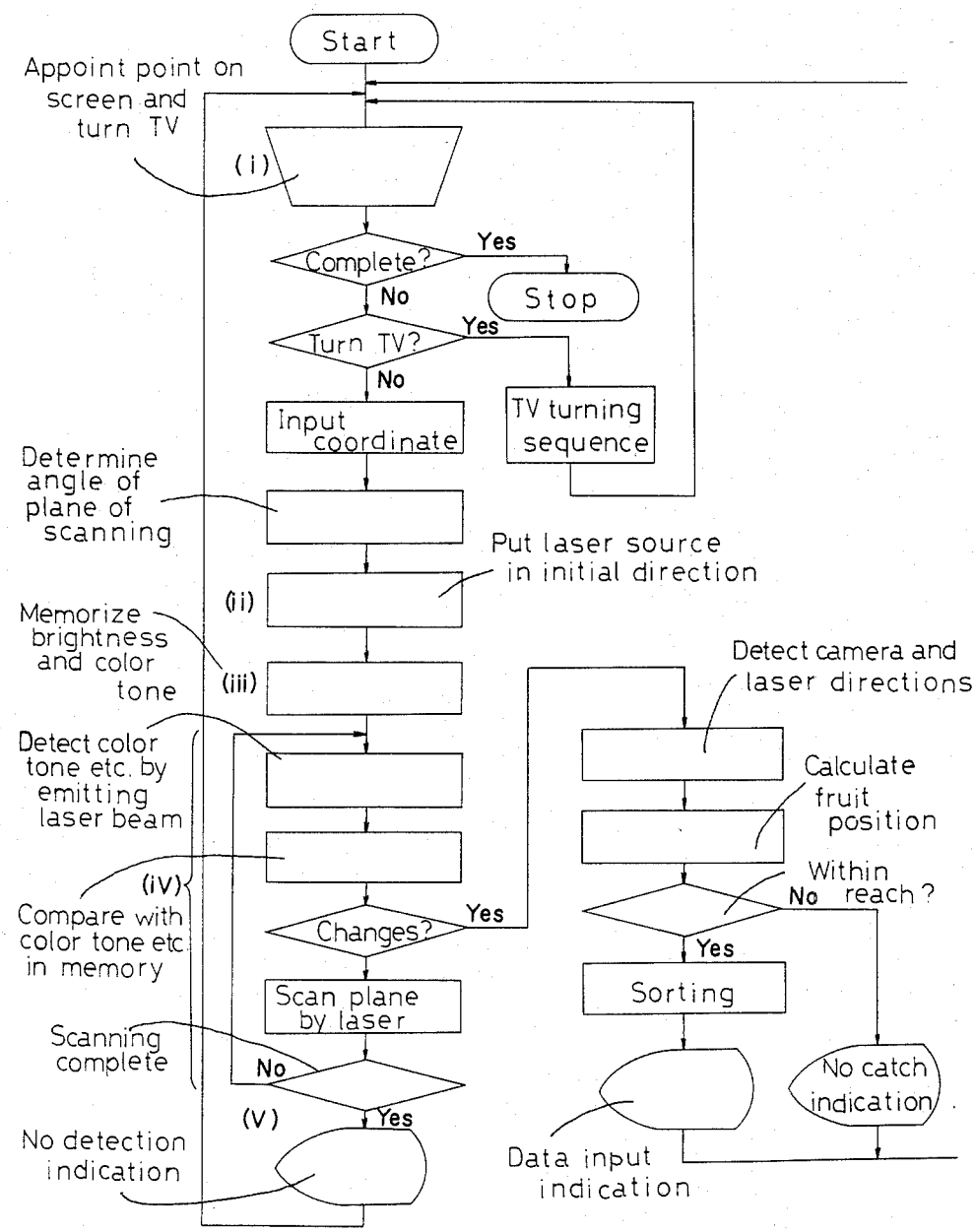

FIG. 7(A) shows a principle of another example of fruit position detector which is operable according to a sequence shown in FIG. 7(B).

A TV camera 9 is pivotable by means of a motor (not shown) on a first horizontal axis E1 with an optic axis t thereof adjusted to be perpendicular to the first horizontal axis E1. A laser source 22, which is a spot beam emitter, also is pivotable with an optic axis r along which a laser beam travels adjusted to be perpendicular to the second horizontal axis E2. Both the TV camera 9 and laser source 22 are pivotable by means of motors (not shown) on a vertical axis E3 also.

Both the first and second horizontal axes E1 and E2 are perpendicular to the vertical axis E3 and rotatable on the vertical axis E3 independently of each other. Turning angles $\phi 1$ and $\phi 2$ of the two horizontal axes E1 and E2 on the vertical axis E3 are detected by rotary encoders 27 and 28 relative to a common reference. A turning angle $\phi 3$ of the TV camera 9 on the first horizontal axis E1 and turning angle $\phi 4$ of the laser source 22 on the second horizontal axis E2 are detected by rotary encoders 25 and 26. The rotations on these axes E1, E2 and E3, respectively, are effected by motors (not shown) under control by a computer.

As shown in FIG. 7(A), the TV camera 9 and the laser source 22, respectively, are mounted in position such that the vertical axis E3, the first horizontal axis E1 and the optic axis t of the TV camera 9 cross on another at one point and that the vertical axis E3, the second horizontal axis E2 and the optic axis r of the laser source 22 cross one another at one point.

Facing directions of this TV camera 9 is controlled by the computer. On the basis of signals from a control console (not shown) the computer turns the TV camera 9 from one facing direction to another as shown in the flow chart of FIG. 7(B). The console is adapted to take input of a coordinate on a screen (schematically shown at S) of a monitor television (not shown) for the TV camera 9 by means of a light pen. This coordinate is given to the computer which calculates component $\phi 5$ and component $\phi 6$ of an angle of deviation from the optic axis t of the TV camera 9 of a line y corresponding to the point on the screen S, and a compensation angle of deviation. In particular, a supplementary line z extends on a plane defined by the optic axis t of the TV camera 9 and the first horizontal axis E1, and a crossing line w between this plane and a plane perpendicular to the vertical axis E3 extends parallel to the first horizontal axis E1. Therefore, the compensation angle $\phi 8$ is derived from an equation, $$\phi 8 = \text{Arctan}(\tan \phi 5 / \sin \phi 3)$$

and angle $\phi 7$ between the line y and the vertical axis E3 is derived from an equation, $$\phi 7 = \text{Arcsin}(\sin \phi 3 \sec \phi 8 / \sec \phi 5).$$

On the basis of the angle $\phi 8$ derived as above, the computer rotates the laser source 22 about the vertical axis E3 to bring the optic axis r of the laser source 22 to a plane defined by the line y and the vertical axis E3, and about the second horizontal axis E2 to a predetermined position. At this time the laser source 22 is at an angle of $\phi 2 = (\phi 1 - \phi 8)$ to the reference about the vertical axis E3.

The computer then takes in and memorizes brightness and color tone of an appointed point on the screen S which are transmitted by an image signal.

Thereafter the operation moves on to the stages (iv) in which the laser source 22 is gradually rotated on the horizontal axis E2 while monitoring the image signal of the appointed point on the screen S. More particularly, changes in the image signal are checked each time the laser source 22 is rotated by a slight degree, and the rotary encoder 26 detects the angle $\phi 4$ of the line y about the second horizontal axis E2 when certain changes in the image signal are detected. Then a coordinate is calculated on the basis of the principle of triangulation and cylindrical coordinates using the angle $\phi 7$ of the line y relative to the vertical axis E3, the angle $\phi 2$ about the vertical axis E3 and the angle $\phi 4$ about the second horizontal axis E2.

By means of the light pen the operator appoints first A appearing on the screen of the monitor TV each time the TV camera 9 changes its facing direction, whereupon the laser source 22 moves as described above and a laser beam irradiates the fruit A. At this time changes occur in the image signal of the appointed point on the monitor TV screen, and the coordinate of the fruit is put into the computer. Then the computer judges on the basis of the resulting coordinate whether or not the the coordinate is within reach of the picking means 4. If it is out of reach, the computer merely gives an indication to that effect to the operator. If it is within reach, the coordinate is stored in the memory. At this time the coordinate is compared with fruit positions thus far detected in certain respects described below, in order to determine a picking order, and the positions are stored in the memory after a storing operation to arrange the positions in that order. In the picking order first priority is given to fruit in lower positions and then to fruit in nearer positions. Therefore, the picking operation proceeds from fruit at a lowermost position, and from the nearest fruit on a substantially equal height.

Figure 8A:
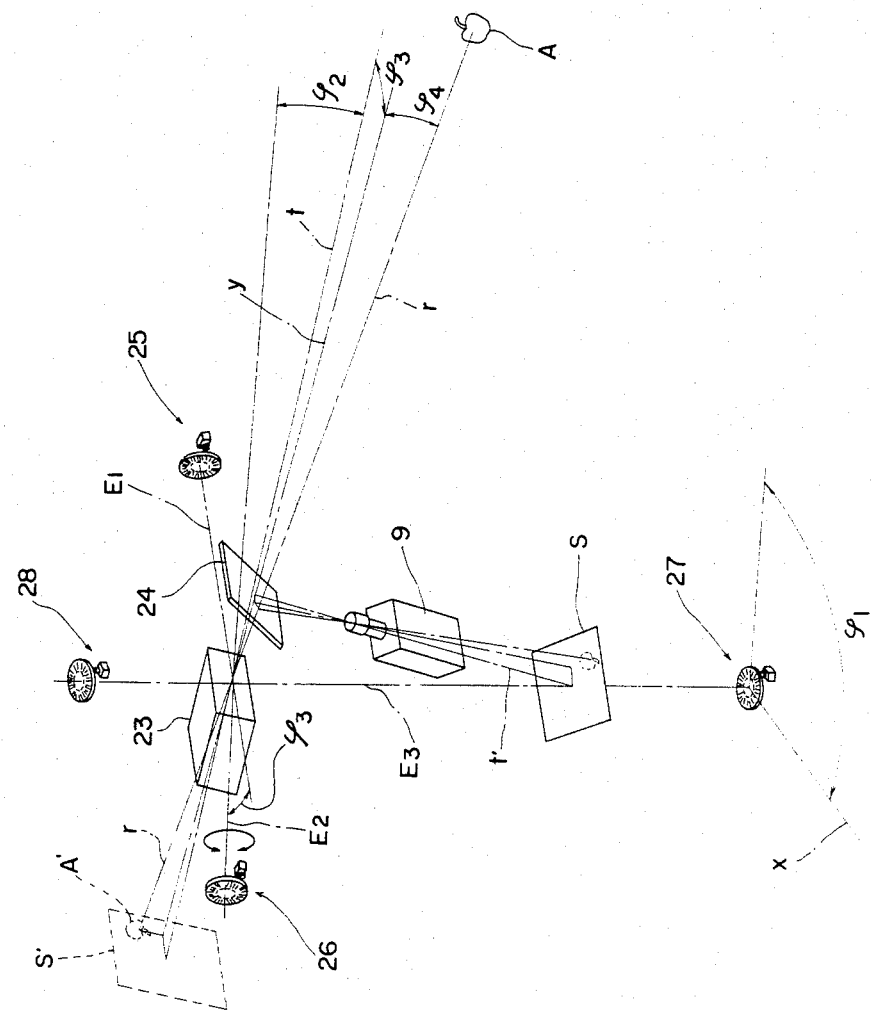
Figure 8:
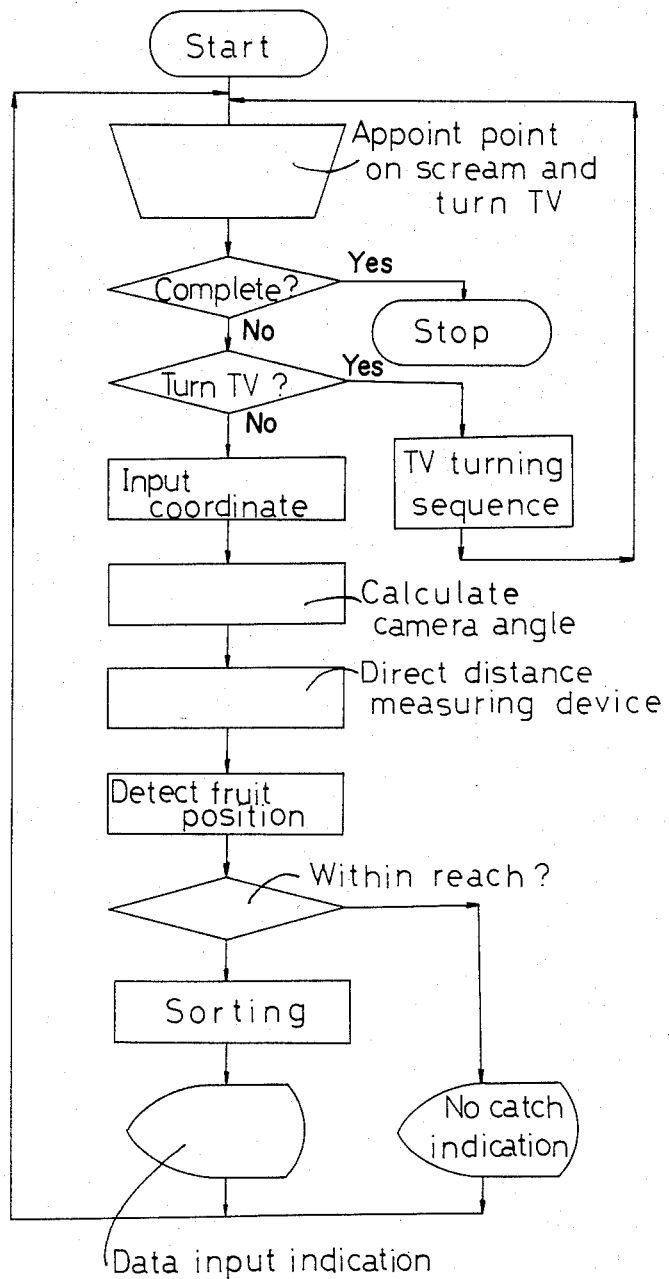

FIG. 8(A) shows a principle of a further example of fruit position detector which is operable according to a sequence shown in FIG. 8(B). A TV camera 9 and an infrared distance measuring device 23 are disposed at one optical point. By appointing a point on a screen shown by the TV camera 9, the infrared distance measuring device 23 automatically turns to face a direction corresponding to the appointed point and measures a distance to an object lying in that direction.

The TV camera 9 and a reflector 24 or a prism provided thereabove are pivotable on a first horizontal axis E1. The TV camera 9 has an optic axis t' refracted by the reflector 24 or the prism to extend in a direction t which is perpendicular to the first horizontal axis E1.

The first horizontal axis E1 is perpendicular to and rotatable about a vertical axis E3, and the TV camera 9 and the reflector 24 are rotatable together with the first horizontal axis E1 about the vertical axis E3. On the other hand, the infrared distance measuring device 23 disposed at a crossing point of the first horizontal axis E1 and the vertical axis E3 has an optic axis r crossing a second horizontal axis E2 at right angles, and is pivotable on the second horizontal axis E2. The second horizontal axis E2 crosses the vertical axis E3 at right angles, and is rotatable thereabout. Therefore, the infrared distance measuring device 23 is rotatable together with the second horizontal axis E2 about the vertical axis E3.

A first rotary encorder 27 detects a turning angle $\phi 1$ of the first horizontal axis E1 about the vertical axis E3 relative to a reference line x fixed to the main frame (not shown), and a second rotary encorder 25 detects a turning angle $\phi 2$ about the first horizontal axis E1 of the line t corresponding to the optic axis of the TV camera relative to a plane perpendicular to the vertical axis E3. A third rotary encorder 28 which is connected to the first horizontal axis E1 detects a turning angle $\phi 3$ of the second horizontal axis E2 about the vertical axis E3 relative to the first horizontal axis E1. A fourth rotary encorder 26 detects a turning angle $\phi 4$ of the optic axis r of the infrared distance measuring device 23 about the second horizontal axis E2.

The rotations of the TV camera 9 and the infrared distance measuring device 23 on the axes E1, E2 and E3 are effected by pulse motors (not shown) which operate according to pulse outputs of a computer.

Therefore, the facing directions of the TV camera 9 are controlled by the computer. The computer turns the TV camera 9 from one facing direction to another every time the computer receives an instruction from a control console (not shown) to turn the TV camera 9, as shown in the flow chart of FIG. 8(B).

This console has a monitor TV (not shown) which displays a picture transmitted from the TV camera 9. By appointing a point on a screen of the monitor TV with a light pen, its coordinate is put into the computer. The computer turns the infrared distance measuring device 23 to direct the optic axis r thereof in a direction corresponding to the above apointed point on the basis of the turning angles $\phi 1$ and $\phi 2$ of the line t corresponding to the optic axis of the TV camera 9 and the coordinate of the appointed point.

Assuming that the optic axis t of the TV camera 9 extends in the direction shown in FIG. 8(A) and at turning angles $\phi 1$ and $\phi 2$ about the vertical axis E3 and the first horizontal axis E1, respectively, the screen at this time is as schematically shown at S in FIG. 8(A). This screen S shows an image of the reflector 24 which is a picture S' optically shown by broken lines. As soon as a point on the screen S' is appointed, angles $\phi 3$ and $\phi 4$ of the line r extending in a direction corresponding to its coordinate relative to the optic axis t of the TV camera 9 are detected. According to the described construction, a plane including the lines y and t includes the first horizontal axis E1.

Thus the computer transmits a pulse signal to each of the pulse motors to rotate the infrared distance measuring device 23 on the vertical axis E3 and the second horizontal axis E2, whereby the infrared distance measuring device 23 faces the direction corresponding to the appointed point. The rotary encorders 25, 26, 27 and 28 detect actual turning angles $\phi 1$, $\phi 2$, $\phi 3$ and $\phi 4$ about the respective axes for use in correcting operational errors of the pulse motors.

Thereafter the computer measures the distance by moving the reflector 24 from the optic axis r of the infrared distance measuring device 23.

The infrared distance measuring device 23 has a construction, in principle, similar to that of a device commonly used with a camera, which emits an infrared ray and measures the time it takes to return. This device 23 measures time with a precision of 0.1–0.2 nanosecond to provide a several centimeter precision.

Thus, a coordinate of the position of fruit A is detected on the basis of polar coordinates using the angle of the infrared distance measuring device 23 about the vertical axis E3 relative to the main frame, the angle about the second horizontal axis E3 relative to the vertical axis E3, and the distance of the objective fruit.

Then the computer judges on the basis of the resulting coordinate whether or not the coordinate is within reach of the picking means 4. If it is out of reach, the computer merely gives an indication to that effect to the operator. If it is within reach, the coordinate is stored in the memory. At this time the coordinate is compared with fruit positions thus for detected in certain respects described below, in order to determine a picking order, and the positions in that order. In the picking order first priority is given to fruit in lower positions and then to fruit in nearer positions. Therefore, the picking operation proceeds from fruit at a lowermost position, and from the nearest fruit on a substantially equal height.

To put the coordinates of fruit into the computer the operator has only to appoint with the light pen the fruit which appear on the monitor TV screen each time the facing direction of the TV camera 9 is changed. After the fruit on the screen are all dealt with, the TV camera is turned to another direction and by repeating this process, the coordinates of all the fruits that can be picked are stored in the computer.

We claim:
1. A fruit harvesting apparatus comprising:
    means for searching and detecting the positions of fruit including a TV camera with a variable shooting direction, a TV monitor for said camera, spot light emitting means for emitting light and means for varying the shooting direction of said camera and the direction of the emitted light and position of said spot emitting means in response to instructions supplied thereto;
    movable means for picking fruit; and
    control means for supplying instructions for movement to said TV camera and spot light emitting means, for determining the position of a detected fruit from the direction of shooting of said camera, the position of said spot light emitting means and direction of light emitted by said spot light emitting means by triangulation and causing movement of said fruit picking means to the position of a detected fruit.
2. A fruit harvesting apparatus comprising:
    means for searching and detecting the positions of fruit including a TV camera with a variable shooting direction, a TV monitor having a screen for producing a display in accordance with the output of said camera and for detecting the position of a probe touching a given position on the screen to select an object, spot light emitting means for emitting light, and means for varying the shooting direction of said camera and the direction of the emitted light of said spot emitting means so that said camera scans on a line extending from said camera in a direction corresponding to the position of said probe on said screen in response to instructions supplied thereto;
    movable means for picking fruit; and
    control means for supplying instructions for movement to said TV camera and said spot light emitting means, for determining the position of a detected fruit from the direction in which said line extends and the direction of light emitted by said spot emitting means by triangulation and causing movement of said fruit picking means to the position of a detected fruit.

3. A fruit harvesting apparatus comprising:

means for searching and detecting the positions of fruit including a TV camera and a monitor therefor;

means for memorizing the positions of fruit detected by said searching and detecting means and determining a picking order starting with fruit at a lowermost position;

movable means for picking fruit including a trap having an upper opening for receiving a fruit to be picked and a plurality of contact sensors disposed about said opening for detecting the positional relationship between a fruit and said opening; and control means for causing said picking means to be positioned under and at a distance from a fruit to be picked and thereafter to raise said picking means while adjusting the horizontal position thereof so that said fruit to be picked is guided into said trap.

4. An apparatus as in claim 3 wherein said picking means further includes a cutter mounted at the top of said opening for cutting calyxes of fruit and having blades which cross one another centrally of the top of said opening to cut said calyxes and means for actuating said cutter.

5. An apparatus as in claim 4 wherein said picking means includes a plurality of photosensors each comprising a light emitter and a light receiver for causing said actuating means to actuate said cutter when said first is in said trap.

6. An apparatus as in claim 4 wherein said actuating means includes an air powered motor and means adjacent the top of said opening for exhausting air.

* * * * *